(12) United States Patent
Inagaki et al.

(10) Patent No.: US 7,802,663 B2
(45) Date of Patent: Sep. 28, 2010

(54) VEHICLE BRAKE SYSTEM

(75) Inventors: Hiromi Inagaki, Saitama (JP); Yasuhiro Arikawa, Saitama (JP); Masaru Gotoh, Saitama (JP); Hidetoshi Kobori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1362 days.

(21) Appl. No.: 11/241,730

(22) Filed: Sep. 30, 2005

(65) Prior Publication Data

US 2006/0071546 A1 Apr. 6, 2006

(30) Foreign Application Priority Data

Sep. 30, 2004 (JP) .......................... P.2004-288383
Mar. 30, 2005 (JP) .......................... P.2005-099717

(51) Int. Cl.
*F16D 69/00* (2006.01)
*B60R 25/08* (2006.01)

(52) U.S. Cl. ............... 188/265; 188/106 P; 188/106 A; 303/89

(58) Field of Classification Search ............ 303/3, 303/15, 89; 188/18 A, 70 R, 325, 328, 106 F, 188/106 A, 264
See application file for complete search history.

(56) References Cited

U.S. PATENT DOCUMENTS

| | | | |
|---|---|---|---|
| 3,752,266 A * | 8/1973 | Chouings ................... | 188/170 |
| 3,874,747 A * | 4/1975 | Case et al. .................. | 303/89 |
| 3,897,115 A * | 7/1975 | DeGeeter et al. ............ | 303/71 |
| 4,007,815 A * | 2/1977 | Acre .......................... | 188/265 |
| 4,451,095 A * | 5/1984 | Chichester et al. .......... | 303/71 |
| 4,784,241 A * | 11/1988 | Temple et al. .............. | 188/70 R |
| 4,784,244 A * | 11/1988 | Carre et al. ................. | 188/156 |
| 4,856,622 A * | 8/1989 | Sartain et al. ............... | 188/170 |
| 5,281,007 A * | 1/1994 | Brainard ..................... | 303/11 |
| 5,954,162 A | 9/1999 | Feigel et al. | |
| 6,360,852 B1 * | 3/2002 | Sherman et al. ........... | 188/70 R |
| 7,188,710 B2 * | 3/2007 | Reuter et al. ............... | 188/72.7 |
| 7,191,862 B2 * | 3/2007 | Wattenburg et al. ......... | 180/275 |
| 7,458,445 B2 * | 12/2008 | Inagaki et al. .............. | 188/72.7 |

(Continued)

FOREIGN PATENT DOCUMENTS

DE        103 29 694 A1      4/2004

(Continued)

*Primary Examiner*—Bradley T King
*Assistant Examiner*—Thomas Irvin
(74) *Attorney, Agent, or Firm*—Carrier, Blackman & Associates P.C.; William D. Blackman; Joseph P. Carrier

(57) ABSTRACT

A lock piston operates to automatically lock a parking brake piston which achieves a parking brake applied state in response to hydraulic pressure in a parking brake application control hydraulic chamber and operates to release a locked state in response to hydraulic pressure in a parking brake release control hydraulic chamber, and a manual change-over unit holding the hydraulic pressure in the parking brake release control hydraulic chamber to a hydraulic pressure on a lock release side, is provided among the wheel brake side hydraulic path, the parking brake application control hydraulic chamber and the parking brake release control hydraulic chamber by bypassing a hydraulic pressure control unit which changes over the application or release of hydraulic pressure to the parking brake application control hydraulic chamber and the parking brake release control hydraulic chamber.

5 Claims, 7 Drawing Sheets

U.S. PATENT DOCUMENTS

| | | | |
|---|---|---|---|
| 2002/0157907 A1* | 10/2002 | Shaw et al. | 188/79.51 |
| 2005/0258682 A1* | 11/2005 | Halasy-Wimmer et al. | 303/89 |

FOREIGN PATENT DOCUMENTS

| | | |
|---|---|---|
| DE | 10 2004 015 447 A1 | 12/2004 |
| DE | 10 2004 037 308 A1 | 2/2005 |
| JP | 10-512947 | 12/1998 |

\* cited by examiner

VEHICLE BRAKE SYSTEM

The present invention claims foreign priority to Japanese patent application no. P.2004-288383, filed on Sep. 30, 2004 and P. 2005-099717, filed on Mar. 30, 2005, the contents of which are incorporated herein by reference.

BACKGROUND OF THE INVENTION

1. Field of the Invention

The present invention relates a vehicle brake system, and particularly to a vehicle brake system which is adapted to obtain a parking brake applied state by virtue of the function of hydraulic pressure.

2. Description of the Background Art

A vehicle brake system of this general type is known in, for example, Japanese Unexamined Patent Publication No. JP-A-10-512947 (also referred to herein as Patent Document No. 1).

Incidentally, in Patent Document No. 1, a brake piston is divided into front and rear brake pistons, a spring is provided in a contracted state between a transmission member which is in abutment with a front end of the rear brake piston and a closure plate that is fixed to the front brake piston, a latch, which is adapted to be mesh engagement with internal teeth cut into an internal surface of a brake caliper at the rear of the front brake piston, is accommodated within the brake caliper in such a manner that the latch is brought into engagement with the internal teeth in such a state that the transmission member is in abutment with a front end of the rear brake piston, whereas the engagement of the latch with the internal teeth is released by virtue of a biasing force of the spring when the transmission member moves relatively forwards from the front end of the rear brake piston, and an auxiliary piston, which is adapted to move the transmission member axially relative to the rear brake piston, is fitted slidably in the rear brake piston. However, since the internal teeth have to be cut into the internal surface of the brake caliper and the latch is made to be accommodated in the brake caliper while the brake piston is divided into the front and rear brake pistons, the inside construction of the brake caliper becomes complex.

SUMMARY OF THE INVENTION

The prevent invention was made in view of the situations, and an object thereof is to provide a vehicle brake system which makes it possible not only to obtain a parking brake applied state by a simple construction in which hydraulic pressures are changed over by electrically controlling a hydraulic pressure control unit but also to release the parking brake applied state by a manual operation even in the event that the hydraulic pressure control unit fails in the parking brake applied state.

With a view to attaining the object, according to a first aspect of the present invention, there is provided a vehicle brake system comprising:

a hydraulic pressure generating unit applying hydraulic pressure to a wheel brake side hydraulic path connected to a wheel brake in accordance with an operation of a brake operation member;

a hydraulic pressure supply operated independently of the hydraulic pressure generating unit;

a parking brake piston achieving a parking brake applied state of a wheel amounted on the wheel brake through a forward movement thereof according to an increase of hydraulic pressure in a parking brake application control hydraulic chamber to which a back side of the parking brake piston faces;

a lock piston operated so as to automatically lock the parking brake piston at a front position and also operated to a lock releasing side according to an increase of hydraulic pressure in a parking brake release control hydraulic chamber;

a hydraulic pressure control unit which is electrically controlled so as to effect a changeover between the application of hydraulic pressure from the hydraulic pressure supply to the parking brake application control hydraulic chamber and the parking brake release control hydraulic chamber and the release of hydraulic pressure so applied from the parking brake application control hydraulic chamber and the parking brake release control hydraulic chamber; and a manual change-over unit provided among the wheel brake side hydraulic path, the parking brake application control hydraulic chamber and the parking brake release control hydraulic chamber in such a manner as to bypass the hydraulic pressure control unit, the manual change-over unit operated according to a manual operation of an operating member, wherein when the manual operation of an operating member is activated, the manual change-over unit establishes a communication between the wheel brake side hydraulic path and the parking brake application control hydraulic chamber and holds the hydraulic pressure of the parking brake release control hydraulic chamber to hydraulic pressure of the lock release side.

According to a second aspect of the present invention, as set forth in the first aspect of the present invention, it is preferable that the hydraulic pressure control unit controls such that:

applying hydraulic pressure to the parking brake application control hydraulic chamber and the parking brake release control hydraulic chamber so that the parking brake piston travels forwards while suppressing the locking operation of the lock piston;

releasing the hydraulic pressure in the parking brake release control hydraulic chamber so as to lock the parking brake piston; and after achieving the parking brake applied state, releasing the hydraulic pressure in the parking brake application control hydraulic chamber.

According to a third aspect of the present invention, as set forth in the first aspect of the present invention, it is preferable that a pressure receiving area of the lock piston which faces the parking brake release control hydraulic chamber is set greater than a pressure receiving area of the parking brake piston which faces the parking brake application control hydraulic chamber.

According to a fourth aspect of the present invention, as set forth in the first aspect of the present invention, it is preferable that the vehicle brake system further comprising a drum brake as a parking brake, the drum brake including a parking brake operation lever, wherein the parking piston and the lock piston is fixed to the drum brake is such a manner that a longitudinal axis of the parking piston is perpendicular to a longitudinal axis of the lock piston and that the parking piston is integral with the lock piston, and the parking piston drives the parking brake operation lever so as to apply parking brake.

According to a fifth aspect of the present invention, as set forth in the first aspect of the present invention, it is preferable that the vehicle brake system further comprising:

a disc brake; and
a drum brake for the parking brake,
wherein the manual change-over unit includes:
a first hydraulic path which connects between a disc brake side hydraulic path to which the output hydraulic pressure from the master cylinder is led and the parking brake application control hydraulic chamber to thereby bypass the hydraulic pressure control unit;
a normally closed valve interposed in the first hydraulic path, the normally closed valve is opened by a manual operation;
a second hydraulic path one end of which is connected to the first hydraulic path at a position between the normally closed valve and the parking brake application control hydraulic chamber, and the other end of which communicates with the parking brake release control hydraulic chamber in such a manner to bypass the hydraulic pressure control unit; and
a one-way valve interposed in the second hydraulic path in such a manner as to permit only a flow to the parking brake release control hydraulic chamber side.

According to the invention, since the parking brake piston advances and the lock piston mechanically locks the parking brake piston at its front position when the hydraulic pressure in the hydraulic pressure supply is made to be applied into the parking brake application control hydraulic chamber behind the parking brake piston, the parking brake applied state can automatically be obtained, and when releasing the parking brake applied state, the hydraulic pressure in the hydraulic pressure supply may only have to be applied into the parking brake release control hydraulic chamber so as to make the lock piston perform a lock release operation, whereby the parking brake applied state can automatically be obtained by a simple construction which involves no power consumption in the parking brake applied state.

In addition, when the electrically controlled hydraulic pressure control unit fails in the parking brake applied state, the manual change-over unit only has to be activated by the operating member so as to make the brake operation member operate intermittently. This allows the hydraulic pressure that is outputted from the hydraulic pressure generating unit by the operation of the brake operation member to be applied not only to the parking brake application control hydraulic chamber but also to the parking brake release control hydraulic chamber by the operation of the manual change-over unit, whereby, when the brake operation member is returned, while the hydraulic pressure in the parking brake application control hydraulic chamber is returned to the hydraulic pressure generating unit' side to thereby be released, the hydraulic pressure in the parking brake release control hydraulic chamber is maintained to the hydraulic pressure of the lock release side by the action of the manual change-over unit. Consequently, in the event that after the brake operation member has been operated intermittently a plurality of times, the manual operation of the operating member is stopped, while the hydraulic pressure in the parking brake application control hydraulic chamber is in the released state, the hydraulic pressure in the parking brake release control hydraulic chamber remains held at the hydraulic pressure of the lock release side, and the lock piston performs a lock release operation, whereby the parking brake applied state is released. Namely, even in the event that the hydraulic pressure control unit fails in the parking brake applied state, the parking brake applied state can be released by the action of the manual change-over unit that is triggered by the manual operation of the operating unit and the intermittent operation of the brake operation member.

DETAILED DESCRIPTION OF ILLUSTRATIVE EMBODIMENTS

Hereinafter, a mode for carrying out the invention will be described based on selected illustrative embodiments of the invention that are shown in the accompanying drawings. As used herein, any reference number followed by three spaced-apart periods, such as, e.g. "27 . . . " is meant to signify that two or more of the indicated components are present in the described apparatus.

Figure 1:
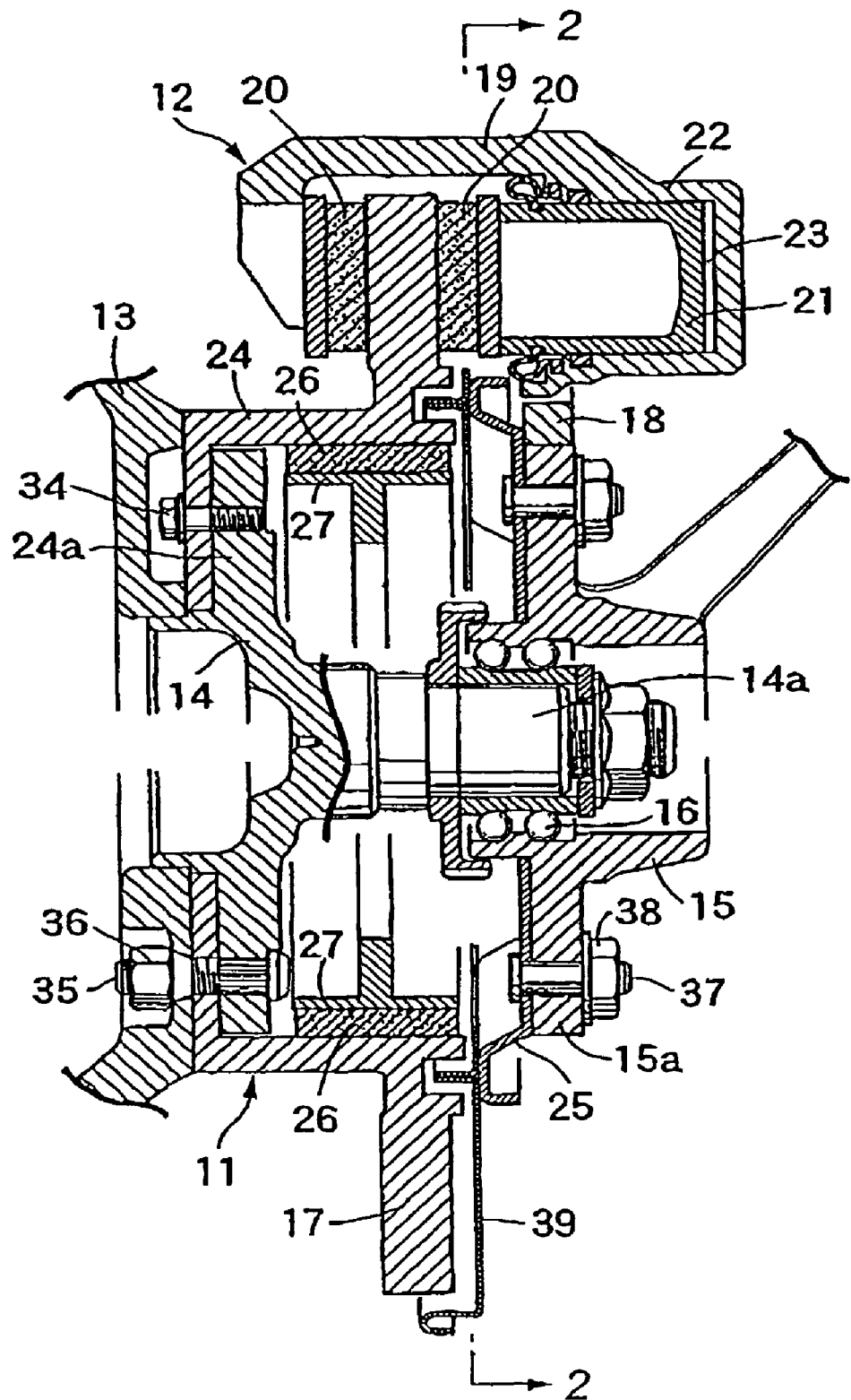
FIG. 1 is a vertical sectional view of a disc brake with a parking drum brake which is taken along the line 1-1 in FIG. 2.
Figure 2:
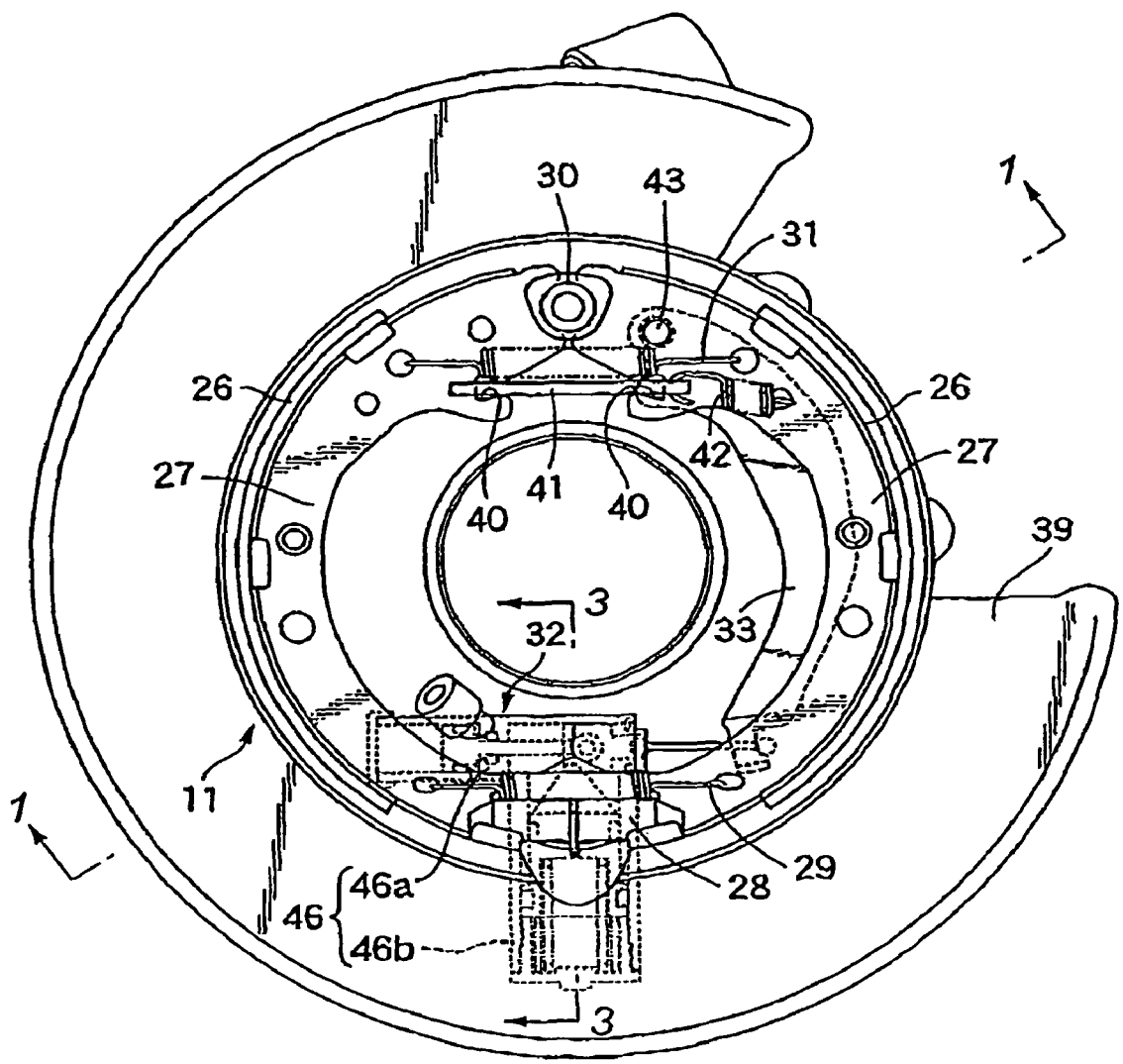
FIG. 2 is a view resulting when a backing plate side of the parking drum brake is seen in a direction indicated by arrows attached to the line 2-2 in FIG. 1.
Figure 3:
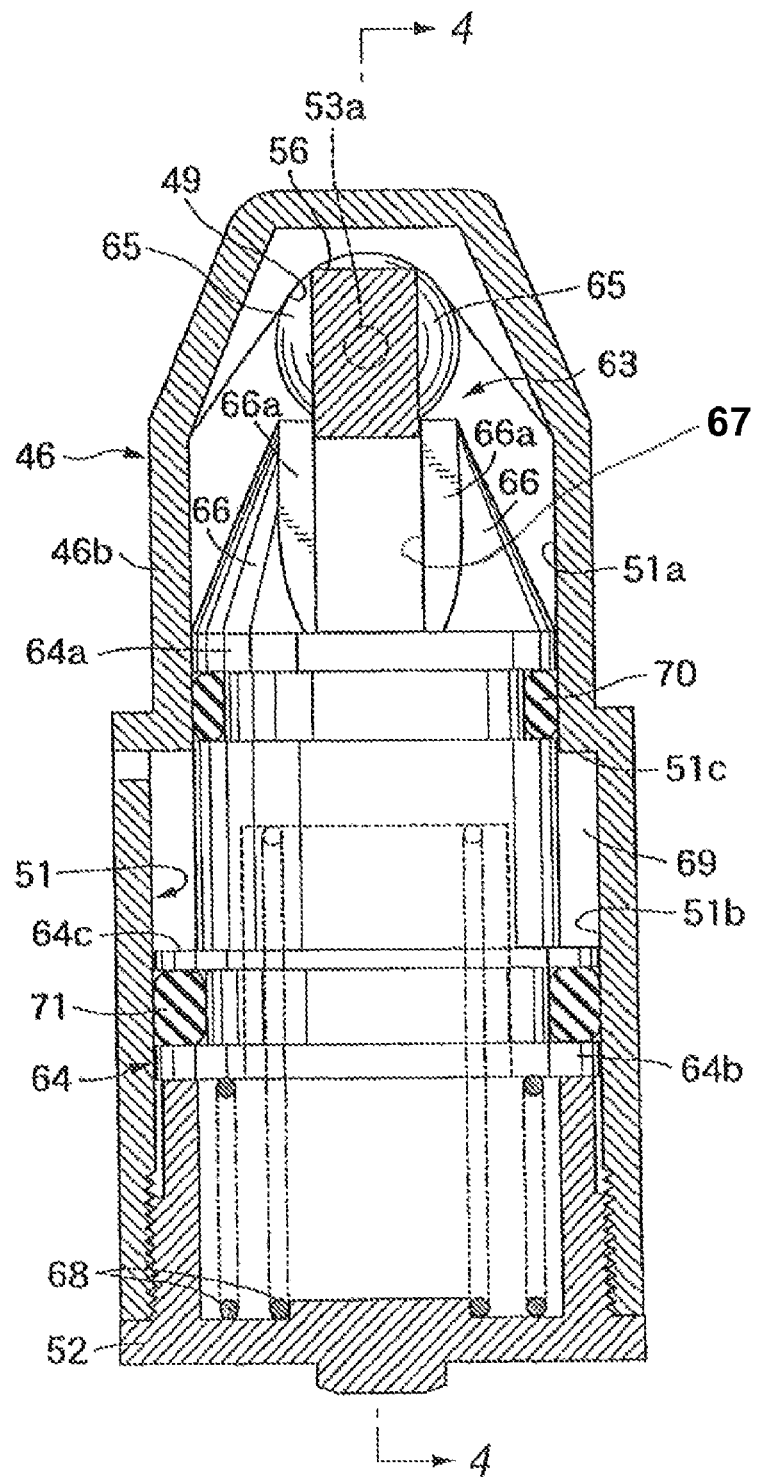
FIG. 3 is an enlarged sectional view taken along the line 3-3 in FIG. 2.
Figure 4:
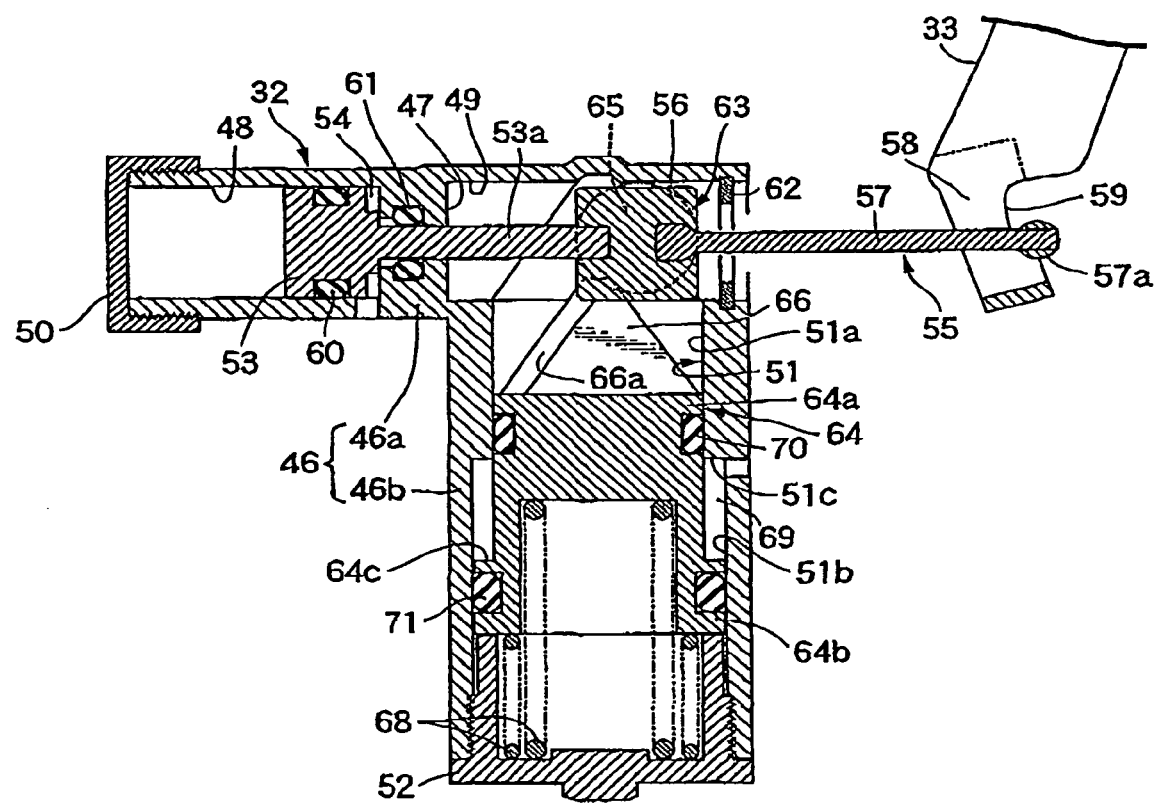
FIG. 4 is a sectional view taken along the line 4-4 in FIG. 3.
Figure 5:
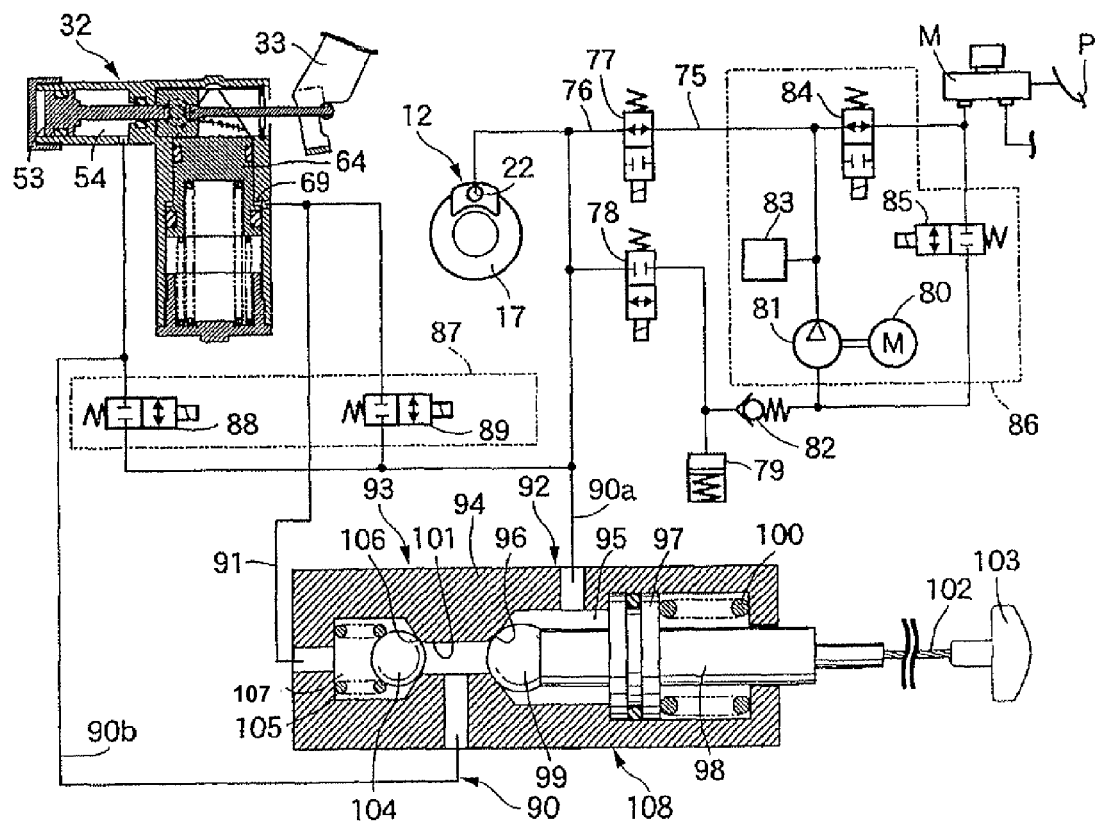
FIG. 5 is a diagram showing a hydraulic brake circuit.

FIGS. 1 to 5 show a first embodiment of the invention, in which FIG. 1 is a vertical sectional view of a disc brake with a parking drum brake which is taken along the line 1-1 in FIG. 2, FIG. 2 is a view in which a backing plate side of the parking drum brake is seen from a direction indicated by arrows attached to the line 1-1 in FIG. 1, FIG. 3 is an enlarged sectional view taken along the line 3-3 in FIG. 2, FIG. 4 is a sectional view taken along the line 4-4 in FIG. 3, and FIG. 5 is a diagram showing a hydraulic brake circuit.

Firstly, in FIG. 1, a spindle 14a of a hub unit 14, which is concentrically joined to a wheel 13 to which a disc brake 12 is attached, and on which a parking drum brake 11 is additionally provided, is rotatably supported on a knuckle 15 that is supported on a vehicle body (not shown).

The disc brake 12 includes a brake disc 17 that rotates together with the wheel 13, a brake caliper 19 that straddles transversely an upper portion of the brake disc 17 and which is supported by a support bracket 18 in such a manner as to slide in an axial direction of the brake disc 17, and a pair of left and right brake pads 20, 20 which are disposed between both sides of the brake disc 17 and the caliper 19. A hydraulic cylinder 22 is provided in the brake caliper 19 in which a piston 21 is slidably fitted with a distal end thereof directed towards one of the brake pads 20, and the brake disc 17 is pressed against from both the sides thereof by the brake pads 20 . . . through action and reaction that result from the axial operation of the piston 21 according to a hydraulic pressure applied to a hydraulic chamber 23 which a back side of the piston 21 is directed to face, whereby a braking force is obtained.

Referring also to FIG. 2, the parking drum brake 11 includes a brake drum 24, a backing plate 25 that is fixedly attached to the knuckle 15 in such a manner as to cover an open end of the brake drum 24, a pair of brake shoes 27, 27 which have linings 26, 26 that are able to be brought into slide contact with the brake drum 24 and which are disposed within the brake drum 24, a strut 28 that can be adjusted to be extended and contracted and which supports ends of the brake shoes 27 . . . in such a manner as to allow a swivel action of the brake shoes 27. A spring 29 is provided in a contracted state between the ends of the brake shoes 27 . . . in such a manner as to bias the ends of both the brake shoes 27 . . . to the strut side 28. An anchor 30 is provided on the backing plate 25 between the other ends of both the brake shoes 27. The parking brake 11 also includes a return spring 31 which biases the other ends of both the brake shoes 27 . . . to a side where the other ends of both the brake shoes 27 . . . are rotatably supported on the anchor 30, a parking brake drive unit 32 and a parking brake operation lever 33 adapted to be driven by the parking brake drive unit to thereby operate to rotate both the brake shoes 27 . . . .

The brake drum 24 is configured such as to be formed into a bottomed cylinder, which is positioned with its open face directed to face the knuckle 15, while an end wall 24a thereof is secured to the hub unit 14 with a plurality of bolts 34 . . . . In addition, the brake disc 17 of the disc brake 12 is formed integrally with the brake drum 24. Furthermore, the wheel 13 is secured to the hub unit 14 with pluralities of stud bolts 35 . . . and wheel nuts 36 . . . with the end wall 24a held therebetween.

The backing plate 25 is disposed in such a manner as to cover an open end of the brake drum 24 and is secured to a flange 15a, which is provided integrally on the knuckle, with pluralities of bolts 37 . . . and nuts 38 . . . . In addition, a support bracket 18, which supports detachably the brake caliper 19, is secured to the backing plate 25, and a protection cover 39, which covers one side and outer circumference of the brake disc 17, is welded to the backing plate 25.

Notches 40 . . . are provided on facing surfaces of the other sides of both the brake shoes 27 . . . and both ends of a strut 41 are brought into engagement with these notches 40 and a spring 42 is provided in a contracted state between one end of the strut 41 and one of the brake shoes 27. The parking brake operation lever 33 is disposed between one of the brake shoes 27 and the backing plate 25 in such a manner as to partially overlap the one of the brake shoes 27, and the parking brake drive unit 32 is connected to one of the parking brake operation lever 33. In addition, the other end of the parking brake operation lever 33 is connected to the other end of the one of the brake shoes 27 via a pivot shaft 43 in such a manner as to be capable of swiveling while being brought into engagement with one end of the strut 41.

Thus, when the parking brake operation lever 33 is caused to rotate clockwise about the pivot shaft 43 by the parking brake drive unit 32 as shown in FIG. 2, the other brake shoe 27 is brought into press contact with an inner circumference of the brake drum 24 via the strut 41, and by reaction of this, the one of the brake shoes 27 is brought into press contact with the inner circumference of the brake drum 24, thereby making it possible to obtain a parking brake applied state by the drum brake 11.

Also referring to FIGS. 3 and 4, the parking brake drive unit 32 includes a casing 46 that is fixed to the backing plate 25 at the ends of both the brake shoes 27 . . . . The casing 46 includes a first cylinder portion 46a which extends in a direction which is in parallel with the strut 28 and the spring 29, and a second cylinder portion 46b which extends in a direction which intersects with the first cylinder portion 46a at right angles and which is integrally provided on the first cylinder portion 46a in such a manner as to continue to an intermediate portion thereof, and the first cylinder portion 46a is disposed on an inner side of the backing plate 25, whereas the second cylinder portion 46b penetrates through the backing plate 25 in such a manner as to extend outwards.

A bulkhead 47 is integrally provided at an axially intermediate portion of the first cylinder portion 46 which is open at both ends thereof, and a first sliding bore 48 is provided in the first cylinder portion 46a forward of the bulkhead 47, whereas an accommodation bore 49, which is coaxial with the first sliding bore 48, is provided in the first cylinder portion 46a rearward of the bulkhead 47, a cap member 50 being screwed on the first cylinder portion 46a in such a manner as to close a front end of the first sliding bore 48.

In addition, a second sliding bore 51 is provided in the second cylinder portion 46b in such a manner as to continue to the accommodation bore 49 at right angles. In this second sliding bore 51, a small diameter bore portion 51a, which continues to the accommodation bore 49 at one end thereof, and a large diameter bore portion 51b, which is larger in diameter than the small diameter bore portion 51a and which continues coaxially to the other end of the small diameter bore portion 51a at one end thereof, are made to continue to each other coaxially, and a stepped portion 51c is formed between the small diameter bore portion 51a and the large diameter bore portion 51b in such a manner as to face an opposite side to the accommodation bore 49, a cap member 52 being screwed in an outer end of the second cylinder portion 46b.

A parking brake piston 53 is slidably fitted in the first sliding bore 48 in the casing 46 which enables the obtaining of a parking brake applied state through its forward travel that is triggered in response to the application of a parking brake application control hydraulic pressure to a back side thereof, and an annular seal member 60 is mounted on an outer circumference of the parking brake piston 53. A parking brake application control hydraulic chamber 54 is formed in the first cylinder portion 46a of the casing 46 between the back side of the parking brake piston 53 and the bulkhead 47, which enables the application of the parking brake application control hydraulic pressure.

The parking brake piston 53 is connected to one end portion of the parking brake operation lever 33 of the drum brake 11 via a connecting unit 55, a pulling force that is applied to the connecting unit 55 in response to the forward travel of the parking brake piston 53 is inputted into the parking brake operation lever 33, whereby the parking brake operation lever 33 is caused to rotate to a side where the parking brake operation lever 33 causes the drum brake 11 to apply the parking brakes.

Thus, the connecting unit 55 is made up of a rod 53a which penetrates through the bulkhead 47 via an annular seal member 61 fluid-tightly and slidably so as to be connected to a central portion of a rear end of the parking brake piston 53 coaxially and integrally, a stopper 56 that is connected to the rod 53a and which is slidably fitted in the accommodation bore 49, and a connecting rod 57 which provides a connection between the stopper 56 and the parking brake operation lever 33, and a snap ring 62 is mounted in the accommodation bore 49 at an end portion thereof which constitutes an opposite side to the bulkhead 47 which prevents the dislodgement of the stopper 56 from the accommodation bore 49.

One end portion of the parking brake operation lever 33 is bent into a substantially U-shape in such a manner as to form a slit 58, and an enlarged engagement portion 57a is provided at an end portion of the connecting rod 57 which is passed through the slit 58 in such a manner as to be brought into abutment and engagement with the one end portion of the parking brake operation lever 33. Moreover, an abutment surface 59 that is provided on the parking brake operation lever 33 for abutment and engagement with the enlarged engagement portion 57a is given an arc-like shape and is formed in such a manner that not only does a tangent of the abutment surface 59 at a contact point with the enlarged engagement portion 57a, when the pulling force applied to the parking brake operation lever 33 in association with the forward travel of the parking brake piston 53 becomes maximum, form a right angle to a direction in which the pulling force is applied from the connecting rod 57 to the parking brake operation lever 33, but also the tangent at any contact point with the enlarged engagement portion 57a within the whole stroke area of the connecting rod form a right angle to the direction in which the pulling force is applied.

Moreover, the external shape of at least a portion of the enlarged engagement portion 57 which contacts the abutment surface 59 is formed into a curved surface which becomes convex towards the abutment surface 59.

In addition, a lock mechanism 63 is provided within the casing 46 which operates to automatically lock the stopper 56 in place in response to the forward travel of the parking brake piston 53, in order to mechanically lock the parking brake piston 53 at its forward position, while operating to a lock release side in response to the application of a parking brake release control hydraulic pressure.

This lock mechanism 63 includes a lock piston 64 which has an axis which intersects with the axis of the parking brake piston 53 at right angles so as to be fitted in the casing 46 slidably while allowing a biasing force to be applied in an axial direction when the parking brake piston 53 travels forwards and which enables the application of the parking brake release control hydraulic pressure in the other axial direction. Referring now to FIGS. 3-4, a locking portion 65 is provided on the stopper 56, which is an intermediate member of the connecting unit 55 which provides a connection between the parking brake piston 53 and the parking brake operation lever 33. A pair of locking portions 66, 66 are provided at an axial end portion of the lock piston 64. The locking portions 66, 66 have an open channel 67 formed therebetween, and are configured in such a manner as to be brought into engagement with the locking portion 65 from the rear so as to mechanically lock the parking brake piston 53 at its forward travel position. As shown in FIG. 3, a lower edge portion of the stopper 56 is slidably disposed in an upper part of the channel 67 between the locking portions 66, 66.

The stopper 56 is formed into a shape having a body portion with a substantially rectangular cross section which is made thin in thickness of plane defined between the axes of the second sliding bore 51 and the accommodation bore 49 which intersect with each other at right angles, and the spherical locking portion 65 is integrally provided on the stopper 56 in such a manner as to protrude from the body portion of the stopper 56 to both sides thereof, part of the locking portion 65 being brought into slide contact with an inner surface of the accommodation bore 49 on an opposite side to the lock piston 64, as shown in FIG. 4.

The lock piston 64 is such as to be slidably fitted in the second sliding bore 51 that is disposed rearward of the parking brake piston 53 and includes integrally a small diameter portion 64a that is slidably fitted in the small diameter bore portion 51a of the second sliding bore 51 and a large diameter portion 64b that forms an annular stepped portion 64c which faces the stepped portion 51c of the second sliding bore 51 between a rear portion of the small diameter portion 64 and itself to thereby continue to the small diameter portion 64 coaxially and which is slidably fitted in the large diameter bore portion 51b of the second sliding bore 51.

In order to spring bias the lock piston 64 to an axial side, that is, a stopper 56 side, for example, a pair of springs 68, 68, which are disposed in parallel with each other, are provided in a contracted state between the lock piston 64 and the cap member 52. In addition, an annular parking brake release control hydraulic chamber 69 is formed between the lock piston 64 and the casing 46 between the stepped portion 64c of the lock piston 64 and the stepped portion 51c of the second sliding bore 51 to which a parking brake release control hydraulic pressure for biasing the lock piston 64 to the other axial side is caused to be applied, and the pressure receiving area of the lock piston 64 which faces the parking brake release control hydraulic chamber 69 is set greater than the pressure receiving area of the parking brake piston 53 which faces the parking brake application control hydraulic chamber 54.

In addition, annular seal members 70, 71 are mounted on outer circumferences of the small diameter portion 64a and the large diameter portion 64b of the lock piston 64, respectively, which seal the parking brake release control hydraulic chamber 69 from both sides thereof in the axial direction to thereby be brought into slide contact with the small diameter bore portion 51a and the large diameter bore portion 51b of the second sliding bore portion 51.

The pair of locking portions 66, 66 are provided in such a manner as to continue to the small diameter portion 64a at one end of the lock piston 64 so as to straddle the stopper portion 56 situated at an intermediate portion of the connecting unit 55 when the parking brake piston 53 is at the forward travel position, and moreover, outer circumferential surfaces of the locking portions 66 . . . are formed into a tapered shape which narrows as it extends to a distal end thereof so as to be inserted in the interior of the accommodating bore 49 which is smaller in diameter than the small diameter bore portion 51a of the second sliding bore 51.

In addition, engagement surfaces 66a . . . are formed on the locking portions 66 . . . which enables rearward abutment and engagement with the locking portion 65, and these engagement surfaces 66a . . . are formed into an arc-like recess so as to mechanically lock the parking brake piston 53 at its forward travel position by coming into abutment and engagement with the locking portion 65 from the rear while being inclined so as to constitute an axial rearward position of the parking brake piston 53 as it extends towards an axial end of the lock piston 64.

In FIG. 5, a master cylinder M, which functions as a hydraulic pressure generating unit for outputting a hydraulic pressure in response to the depression of a brake pedal P which functions as a brake operation member, is connected to a hydraulic pressure supply hydraulic path 75 via a pressure regulator valve 84, and this hydraulic pressure supply hydraulic path 75 is connected to a disc brake side hydraulic path 76 which is a wheel brake side hydraulic path which communicates with the hydraulic cylinder 22 of the disc brake 12 via normally opened solenoid valve 77, while the disc brake side hydraulic path 76 is connected to a reservoir 79 via a normally closed solenoid valve 78. The disc brake 12 operates to apply the brakes by applying a hydraulic pressure outputted from the master cylinder M to the hydraulic chamber 23 of the hydraulic cylinder 22 in such a state that the pressure regulator valve 84 and the normally opened solenoid valve 77 are opened, and a hydraulic pressure applied to the hydraulic cylinder 22 of the disc brake 12 while an anti-lock brake system is being controlled by controlling the opening and closure of the normally opened solenoid valve 77 and the normally closed solenoid valve 78.

In addition, a suction side of a pump 81 that is driven by an electric motor 80 is connected to the reservoir 79 via a one-way valve 82, and a discharge side of the pump 81 is connected to the hydraulic pressure supply hydraulic path 75, a damper 83 being connected to the discharge side of the pump 81. Additionally, the suction side of the pump 81 is connected to the master cylinder M via a suction valve 85.

The electric motor 80, pump 81, damper 83, pressure regulator valve 84 and suction valve 85 make up a hydraulic pressure supply 86. Brake fluid that is taken in from the master cylinder M is discharged to the hydraulic pressure supply hydraulic path 75 by opening the suction valve 85 to activate the electric motor 80 in such a state that the brake pedal P is not operated, and moreover, the hydraulic pressure in the hydraulic pressure supply hydraulic path 75 can be regulated to a predetermined hydraulic pressure by causing the pressure regulator valve 84 to perform a pressure regulating operation. Thus, an output hydraulic pressure such as this from the hydraulic pressure supply 86 is used at the time of automatic braking in which the behaviors of a vehicle is controlled by causing the disc brake 12 to operate to apply the brakes when no brake applying operation is carried out.

The application of hydraulic pressure from the hydraulic pressure supply 86 to the parking brake application control hydraulic chamber 54 and the parking brake release control hydraulic chamber 69 and the release of hydraulic pressure from the parking brake application control hydraulic chamber 54 and the parking brake release control hydraulic chamber 69 are changed over by a hydraulic pressure control unit 87 which is controlled electrically, and this hydraulic pressure control unit 87 is made up of a first control valve 88 that is interposed between the disc brake side hydraulic path 76 and the parking brake application control hydraulic chamber 54 and a second control valve 89 that is interposed between the disc brake side hydraulic path 76 and the parking brake release control hydraulic chamber 69, the first and second control valves 88, 89 being normally closed solenoid valves.

Thus, when attempting to obtain a parking brake applied state, a parking brake application control hydraulic pressure is applied to the parking brake application control hydraulic chamber 54 and furthermore, the hydraulic pressure is applied to the parking brake release control hydraulic pressure chamber 69, whereby the parking brake piston 53 is made to travel forwards while suppressing the operation of the lock piston 64 towards the axial end thereof. Next, when the hydraulic pressure in the parking brake release control hydraulic chamber 69 is released, the lock piston 64 operates to the axial direction by virtue of the spring force of the springs 68 . . . , and a lock mechanism 63 operates to lock in response to the forward movements of the parking brake piston 53 and a locking mechanism 63.

Namely, the engagement surfaces 66a, 66a formed on the locking portions 66, 66 at the one end of the lock piston 64 are brought into rearward engagement with the engagement portion 65 of the stopper 56 which travels forwards together with the parking brake piston 53, whereby the forward travel state of the parking brake piston 53 is mechanically locked. However, the residual pressure is removed at the time of completion of the travel of the lock piston 64 to the axial direction.

Thus, when the parking brake piston 53 travels forwards as has been described above, the drum brake 11 is activated to apply the brakes by the rotation of the parking brake operation lever 33, and the forward travel state of the parking brake piston 53 is locked, whereby the parking brake applied state is maintained. Moreover, since the force required to be applied to activate both the brake shoes 47 . . . in the drum brake 11 for application of the parking brakes is transmitted to both the brake shoes 47 . . . via the parking brake operation lever 33, the hydraulic pressure that is to be exhibited by the parking brake drive unit 32 based on a lever ratio of the parking brake operation lever 33 may be relatively small.

When attempting to release the parking brake applied state, while the hydraulic pressures at the parking brake application control hydraulic chamber 54 and the parking brake release control hydraulic chamber 69 are increased at the same time, in the pressure increasing process, a larger hydraulic pressure than the spring force of the springs 68 . . . is applied to the lock piston 64 to thereby move the lock piston 64 to the other axial direction, whereby the locked state of the lock mechanism 63 is released, and consequently, the parking brake piston 53 is withdrawn by virtue of the hydraulic pressure at the parking brake application control hydraulic chamber 54. Thus, the parking brake release control hydraulic chamber 69 is held in a hydraulic pressure locked state, and the locking portions 66, 66 of the lock piston 64 is left located at the position where an abutment with the stopper 56 is avoided.

Moreover, since the engagement portion 65 provided on the stopper 56 is such as to be formed into the spherical shape and the engagement surfaces 66a . . . formed on the locking portions 66 . . . of the lock piston 64 so as to mechanically lock the forward travel position of the parking brake piston by being brought into abutment and engagement with the engagement portion 65 from the rear thereof are depressed in the arc-like fashion, a contact area between locking surfaces 65a . . . and the engagement surfaces 66a . . . when the parking brake piston 53 is at the forward travel position is made relatively large, and wear and buckling resulting from load applied to the abutment and engagement portions between the stopper 56 and the lock piston 64 from the parking piston 53 side is suppressed, thereby making it possible to increase the durability of the stopper 56 and the lock piston 64.

A manual change-over unit 108 which bypass the hydraulic pressure control unit 87 is provided between the disc brake side hydraulic path 76 and the parking brake application control hydraulic chamber 54 and the parking brake release control hydraulic chamber 69, and this manual change-over unit 108 operates in response to manual operation of an operation lever 103 which functions as an operation member that is to be disposed in the vicinity of the driver's seat.

Thus, the manual change-over unit 108 includes a first hydraulic path 90 which connects between the disc brake side hydraulic path 76 to which the output hydraulic pressure from the master cylinder M is led and the parking brake application control hydraulic chamber 54 to thereby bypass the hydraulic pressure control unit 87 in such a state that the normally opened solenoid valve 77 and the pressure regulator 84 are opened. A normally closed valve 92 is interposed along the length of the first hydraulic path 90 in such a manner as to be opened manually, a second hydraulic path 91 that is connected at one end to the first hydraulic path 90 between the normally closed valve 92 and the parking brake application control hydraulic chamber 54 and which is made to bypass the hydraulic pressure control unit 87 to thereby communicate at the other end thereof with the parking brake release control hydraulic chamber 69 and a one-way valve 93 that is interposed along the length of the second hydraulic path 91 in such a manner as to permit only a flow to the parking brake release control hydraulic chamber 69 side.

A valve chest 95 which communicates with an upstream side portion 90 of the first hydraulic path 90 which communicates with the disc brake side hydraulic path 76 is formed and a tapered valve seat 96 which faces the valve chest 95 is provided in a valve housing 94 which the normally closed valve 92 has, and a piston 97, whose front face is directed to face the valve chest 95, is fitted in the valve housing 94 fluid-tightly and slidably. In addition, a spherical valve element 99, which can be seated on the valve seat 96, is provided at a front end of a valve stem 98 which is provided on the piston 97 integrally and coaxially in such a manner as to extend forward and rearward from a center of the piston 97, and a valve spring 100 is provided in a contracted state between the piston 97 and the valve housing 94 in such a manner as to bias the piston 97 and the valve stem 98 in a direction in which the valve element 99 is seated on the valve seat 96. In addition, a passageway 101 is provided in the valve housing 94 which is made to open to the center of the valve seat 96 at one end thereof, and an intermediate portion of the passageway 101 is made to communicate with a downstream side portion 90b of the first hydraulic path 90 which communicates with the parking brake application control hydraulic chamber 54.

An operation lever 103 is connected to the other end of the valve stem 98 via a wire 102, and this operation lever 103 is disposed in the vicinity of the driver's seat such as within a center console. Thus, in a non-operating state of the operation lever 103, the normally closed valve 92 is in a closed state in which the valve element 99 is seated on the valve seat by virtue of the spring force of the valve spring 100, and in this closed state, a communication between the upstream side portion and downstream side portion 90a, 90b of the first hydraulic path 90 is interrupted. However, when the operation lever 103 is operated to be pulled against the spring force of the valve spring 100, the valve element 99 leaves the valve seat 96 to thereby open the normally closed vale 92, whereby a communication is established between the upstream side portion and downstream side portion 90a, 90b of the first hydraulic path 90.

The one-way valve 93 is such as to share the valve housing 94 with the normally closed valve 92, and in this valve housing 94, a tapered valve seat 106 is provided in such a manner that the other end of the passageway 101 is made to open to a central portion thereof, and a valve chest 107, which the valve seat 106 is made to face, is formed in such a manner that a first hydraulic path 90 side end portion of the second hydraulic path 91 is made to communicate with the valve chest 107, a valve spring 105 being provided in a contracted state between a spherical valve element 104 that is accommodated in the valve chest 107 in such a manner as to be capable of being seated on the valve seat 106 and the valve housing 94 in such a manner as to exhibit a biasing force which causes the valve element 104 to be seated on the valve seat 106.

Thus, when the normally closed valve 92 is opened, the one-way valve 108 opens to apply the hydraulic pressure at the first hydraulic path 90 to the parking brake release control hydraulic chamber 69 side, whereas a return of brake fluid from the parking brake release control hydraulic chamber 69 side to the first hydraulic path 90 side is prevented by the one-way valve 93.

Namely, when activated in response to the operation of the operation lever 103, the manual change-over unit 108 establishes a communication between the disc brake side hydraulic path 76 and the parking brake application control hydraulic chamber 54, as well as holding the hydraulic pressure at the parking brake release control hydraulic chamber 69 to the hydraulic pressure of the lock release side.

Next, the function of the first embodiment will be described below. When activating the brake drum 11 for application of the parking brakes, the parking brake application control hydraulic pressure only has to be applied to the parking brake application control hydraulic chamber 54 which the back side of the parking brake piston 53 possessed by the parking brake drive unit 32 is directed to face. When the parking brake piston 53 is made to travel forwards, the drum brake 11 is activated to apply the parking brakes, thereby making it possible to realize the parking brake applied state. In addition, since the parking brake applied state that results from the forward travel of the parking brake piston 53 is mechanically locked by the lock mechanism 63, the parking brake applied state can automatically be obtained. Additionally, when releasing the parking brake applied state, the parking brake release control hydraulic pressure only has to be applied to the lock mechanism 63, and in the parking brake applied state, the parking brake applied state can automatically be obtained by the simple construction which involves no electrical power consumption.

In addition, while the application of hydraulic pressure from the hydraulic pressure supply 86 to the parking brake application control hydraulic chamber 54 and the parking brake release control hydraulic chamber 69 and the release of hydraulic pressure from the parking brake application control hydraulic chamber 54 and the parking brake release control hydraulic chamber 69 is changed over by the hydraulic pressure control unit 87 which is electrically controlled, the manual change-over unit 108 which bypasses the hydraulic pressure control unit 87 is provided between the disc brake side hydraulic path 76, the parking brake application control hydraulic chamber 54 and the parking brake release control hydraulic chamber 69, and this manual change-over unit 108 is adapted to operate in response to the operation of the operation lever 103 that is disposed in the vicinity of the driver's seat.

Moreover, the manual change-over unit 108 is such as to include the first hydraulic path 90 which connects between the disc brake side hydraulic path 76 to which the output hydraulic pressure from the master cylinder M is led and the parking brake application control hydraulic chamber 54 to thereby bypass the hydraulic pressure control unit 87 in such a state that the normally opened solenoid valve 77 and the pressure regulator 84 are opened, the normally closed valve 92 that is interposed along the length of the first hydraulic path 90 in such a manner as to be opened manually, the second hydraulic path 91 that is connected at one end to the first hydraulic path 90 between the normally closed valve 92 and the parking brake application control hydraulic chamber 54 and which is made to bypass the hydraulic pressure control unit 87 to thereby communicate at the other end thereof with the parking brake release control hydraulic chamber 69 and the one-way valve 93 that is interposed along the length of the second hydraulic path 91 in such a manner as to permit only a flow to the parking brake release control hydraulic chamber 69 side.

According to the configuration of the manual change-over unit 108 that has been described above, when the hydraulic pressure control unit 87 fails in the parking brake applied state, the operation lever 103 may be operated to open the normally opened valve 92, while intermittently depressing the brake pedal P. Then, a hydraulic pressure that is outputted from the master cylinder M as a result of the operation of the brake pedal P is applied not only to the parking brake application control hydraulic chamber 54 but also to the parking brake release control hydraulic chamber 69 via the one-way valve 93, whereas when the depressing effort is removed from the brake pedal P, while the hydraulic pressure at the parking brake application hydraulic chamber 54 is returned to the master cylinder M side for release, the hydraulic pressure at the parking brake release control hydraulic chamber 69 never returns to the master cylinder M side by the action of the one-way valve 93.

Consequently, when the operation of the brake pedal P is stopped after the brake pedal P has been depressed intermittently a plurality of times, while the hydraulic pressure in the parking brake application control hydraulic chamber 54 is in the released state, the hydraulic pressure in the parking brake release control hydraulic chamber 69 is held to the hydraulic pressure on the lock release side, whereby the lock piston 64 is activated to release the locked state, so that the parking brake applied state is released. Namely, even in the event that the hydraulic pressure control unit 87 fails in the parking brake applied state, the parking brake applied state can be released by the manual operations in which the normally closed valve 92 is opened through the operation of the operation lever 103 and intermittent operation of the brake pedal P.

Figure 6:
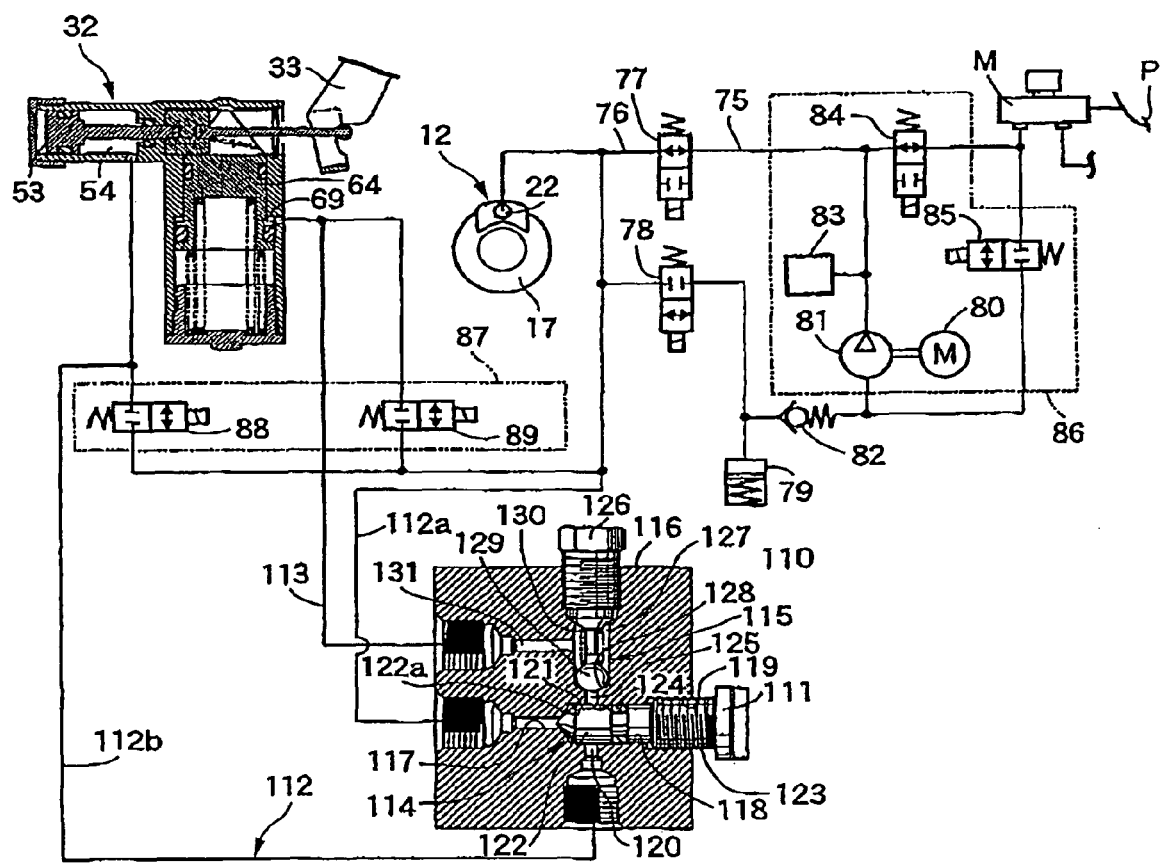
FIG. 6 is a diagram showing a hydraulic brake circuit of a second embodiment which corresponds to FIG. 5.

FIG. 6 shows a second embodiment of the invention, and only like reference numerals are imparted to corresponding portions to those described in the first embodiment, whereby a detailed description thereof will be omitted.

A manual change-over unit 110, which bypasses a hydraulic pressure control unit 87, is provided between a disc brake side hydraulic path 76, a parking brake application control hydraulic chamber 54 and a parking brake release control hydraulic chamber 69, and this manual change-over unit 110 is such as to be activated in response to a manual operation of an operation knob 111. For example, the hydraulic pressure control unit 87 is provided within an engine compartment with the operation knob 111 allowed to be manually operated by opening a bonnet or is provided in a luggage compartment or trunk with the operation knob 111 allowed to be manually operated by opening a trunk lid.

The manual change-over unit 110 includes a first hydraulic path 112 which connects between the disc brake side hydraulic path 76 to which an output hydraulic pressure from a master cylinder M is led and the parking brake application control hydraulic chamber 54 to thereby bypass a hydraulic pressure control unit 87 in such a state that a normally opened solenoid valve 77 and a pressure regulator 84 are opened, a normally closed valve 114 that is interposed along the length of the first hydraulic path 112 in such a manner as to be opened manually, a second hydraulic path 113 that is connected at one end to the first hydraulic path 112 between the normally closed valve 114 and the parking brake application control hydraulic chamber 54 and which is made to bypass the hydraulic pressure control unit 87 to thereby communicate at the other end thereof with the parking brake release control hydraulic chamber 69 and a one-way valve 115 that is interposed along the length of the second hydraulic path 113 in such a manner as to permit only a flow to the parking brake release control hydraulic chamber 69 side.

The normally closed valve 114 is such as to be provided on a body 116, and a first fluid communication bore 117 that is opened in one sides of the body 116 in such a manner as to communicate with an upstream side portion 112a on a disc brake side hydraulic pressure path 76 side of the first hydraulic path 112, a sliding bore 118 which is larger in diameter than the first fluid communication bore 117 and a threaded bore 119 which is larger in diameter than the sliding bore 118 and is opened in the other side of the body 116 are provided in the body 116 in such a manner as to continue to each other coaxially, and a fluid communication bore 120 is also in the body 116 which communicates with a downstream side portion 112b on a parking brake application control hydraulic chamber 54 side of the first hydraulic path 112 and which intersects with the sliding bore 118 at right angles to thereby be opened in an inner surface of the sliding bore 118. The bore 119 opens from the first fluid communication bore 117 to the other side of the body 116.

The normally closed valve 114 is such as to normally interrupt a communication between the fluid communication bores 117, 120 by a valve element 122, and the valve element 122 has at a front end thereof a tapered portion 122a which can be brought into abutment with an inner circumferential edge portion of a tapered stepped portion 121 that is formed between the fluid communication bore 117 and the sliding bore 118 and is fitted in the sliding bore 118 in such a manner as to be capable of rotating about the axis of the sliding bore 118 and moving in an axial direction thereof. A threaded stem portion 123 that is provided integrally with the valve element 122 is fittingly screwed in the threaded bore 119, and the operation knob 111 is integrally and continuously provided at an outer end of the threaded stem portion 123. Moreover, an O ring 124 is mounted on an outer circumference of the valve element 122 in such a manner as to be brought into contact with an inner surface of the sliding bore 118 at a position that is closer to the threaded bore portion 119 than an opening end of the fluid communication bore 120 to the sliding bore 118.

In the closing valve 114 configured as has been described above, the tapered portion 122a at a distal end of the valve element 122 is brought into abutment with the inner circumferential edge portion of the stepped portion 121 along the full circumference by screwing the threaded stem portion 123 into the threaded bore 119, whereby the communication between the fluid communication bores 117 and 120 can be interrupted. In addition, the fittingly screwed state of the threaded stem portion 123 into the threaded bore 119 is relaxed by rotationally operating the operation knob 111 and the valve element 122 is withdrawn until a large diameter end portion of the tapered portion 122a at the distal end of the valve element 122 reaches a position situated closer to the threaded bore 119 than the opening end of the fluid communication bore 120 towards the sliding bore 118, whereby a communication is established between the fluid communication holes 117 and 120.

The one-way valve 115 is such as to be provided in the body 116 of the normally closed valve 114 in such a manner as to share the body 116 with the normally closed valve 114, and a passageway 125 is provided in the body 116 in such a manner as to extend along the same axis as that of the fluid communication bore 120 with the sliding bore 118 interposed therebetween, a valve chest 127 being formed coaxially with the passageway 125 between the body 116 and a plug member 126 which is screwed into the body 116.

Thus, the one-way valve 115 includes a tapered valve seat 128 in which the passageway 125 is opened in a central portion thereof so as to face the valve chest 127, a spherical valve element 129 that is accommodated in the valve chest 127 in such a manner as to be capable of being seated on the valve seat 128, and a valve spring 130 provided in a contracted state between the plug member 126 and the valve element 129 in such a manner as to exhibit a biasing force which causes the valve element 129 to be seated on the valve seat 128.

A passageway 131 is provided in the body 116 which communicates with the parking brake release control hydraulic chamber 69 via the second hydraulic path 113, and an inner end of the passageway 131 is made to communicate with the valve chest 127.

Thus, when the normally closed valve 114 is opened, the one-way valve 115 opens so as to apply the hydraulic pressure at the first hydraulic path 112 to the parking brake release control hydraulic chamber 69, whereas a return of brake fluid from the parking brake release control hydraulic chamber 69 side to the first hydraulic path 112 side is prevented by the one-way valve 115.

Namely, when activated in response to the operation of the operation knob 111, the manual change-over unit 110 communicates between the disc brake side hydraulic path 76 and the parking brake application control hydraulic chamber 54, as well as holding the hydraulic pressure at the parking brake release control hydraulic chamber 69 to the hydraulic pressure of the lock release side.

The same advantage as that provided by the first embodiment can be provided by this second embodiment.

Figure 7:
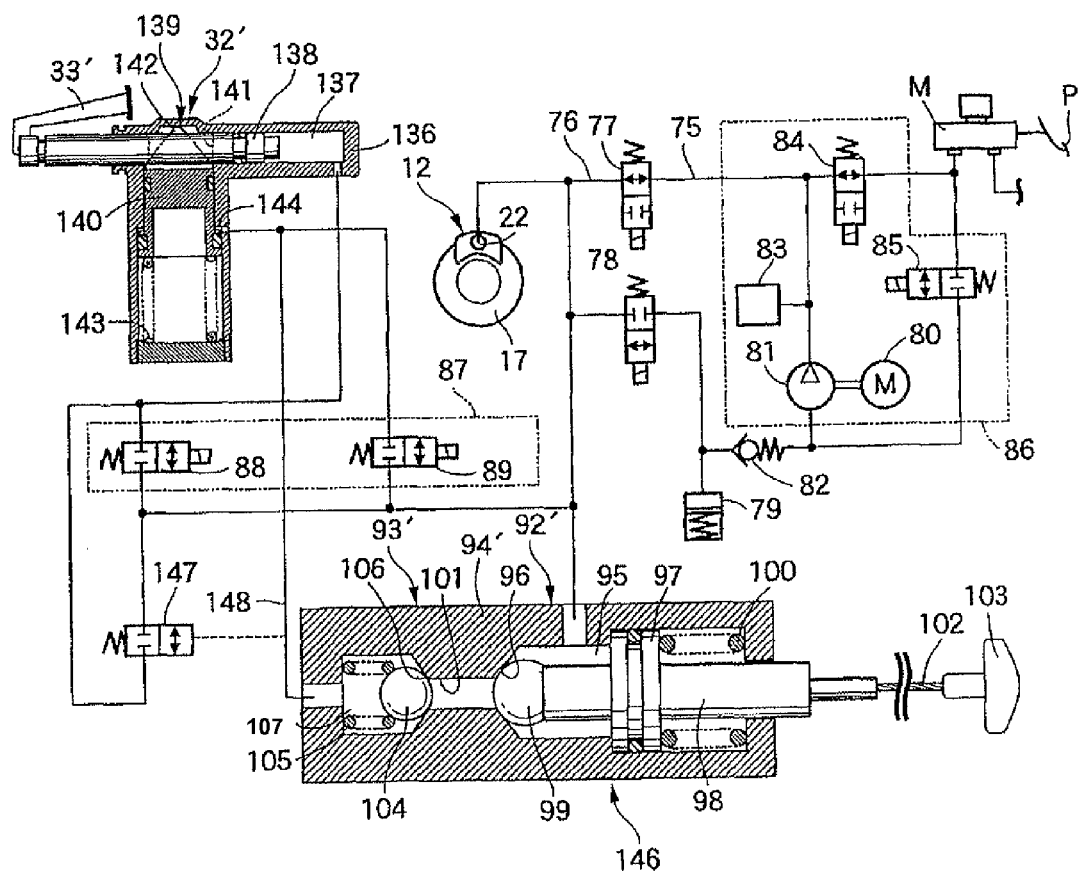
FIG. 7 is a diagram showing a hydraulic brake circuit of a third embodiment which corresponds to FIG. 5.

FIG. 7 shows a third embodiment of the invention, and only like reference numerals are imparted to corresponding portions to those described in the respective embodiments, whereby a detailed description thereof will be omitted.

A parking brake drive unit 32' is such as to obtain a parking brake applied state by pushing on a parking brake operation lever 33', and this parking brake drive unit 32' includes a casing 136 and a parking brake piston 138 that is slidably fitted the casing 136 while being connected to the parking brake operation lever 33' at one end thereof which is made to protrude from the casing and whose back side is directed to face a parking brake application control hydraulic chamber 137 that is formed between the casing 136 and the back side thereof.

In addition, a lock mechanism 139 is provided within the casing 136 which is adapted not only to operate to automatically lock in response to a forward travel of the parking brake piston 138 in order to mechanically lock the parking brake piston 138 at its forward travel position and but also to operate to a lock release side in response to application of a parking brake release control hydraulic pressure.

The lock mechanism 139 includes a lock piston 140 which has an axis that intersects with the axis of the parking brake piston 138 at right angles and which is slidably fitted in the casing 136, a locking bore 141 that is provided at an intermediate portion of the parking brake piston 138 and a lock portion 142 that is provided at an end portion of the lock piston 140 in an axial direction thereof in such a manner as to mechanically lock the forward travel position of the parking brake piston 138.

A spring 143 is provided in a contracted state between the lock piston 140 and the casing 136 which biases the lock piston 140 to one of axial sides, that is, a parking brake piston 138 side. In addition, an annular parking brake release control hydraulic chamber 144 is formed between the lock piston 140 and the casing 136 which biases against the spring force of the spring 143 the lock piston towards a withdrawal direction in which the lock piston 140 is separated from the parking brake piston 138.

The application of hydraulic pressure from a hydraulic pressure supply 86 to the parking brake application control hydraulic chamber 137 and the parking brake release control hydraulic chamber 144 and the release of hydraulic pressure from the parking brake application control hydraulic chamber 137 and the parking brake release control hydraulic chamber 144 are changed over by a hydraulic pressure control unit 87 that is electrically controlled.

Thus, when attempting to obtain a parking brake applied state, a parking brake application control hydraulic pressure is applied to the parking brake application control hydraulic chamber 137 and the hydraulic pressure is further applied to the parking brake release control hydraulic chamber 144, whereby the parking brake piston 138 is made to travel forward while suppressing the travel of the lock piston 140 to an axial direction. Next, when the hydraulic pressure at the parking brake release control hydraulic chamber 144 is released, the lock piston 140 is allowed to travel in the axial direction by virtue of the spring force of the spring 143, whereby the lock mechanism 139 operates to lock in response to the forward travel of the parking brake piston 138 and the lock piston 140.

Namely, as the parking brake piston 138 travels forward, the lock portion 142a of the lock piston 140 is brought into engagement with the locking bore 141 provided at the position which corresponds to the lock piston 140, whereby the forward travel state of the parking brake piston 138 is mechanically locked. However, when the travel of the lock piston 140 to the axial direction is completed, the residual hydraulic pressure in the parking brake application control chamber 137 is removed.

A manual change-over unit 146, which bypasses the hydraulic pressure control unit 87, is provided between the disc brake side hydraulic path 76, the parking brake application control hydraulic chamber 137 and the parking brake release control hydraulic chamber 144, and this manual change-over unit 146 operates in response to a manual operation of an operation lever 103 which functions as an operation member disposed in the vicinity of the driver's seat.

Thus, the manual change-over unit 146 includes a first normally closed valve 147 that is connected in parallel to a first control valve 88 of the hydraulic pressure control unit 87 between the disc brake side hydraulic path 76 to which an output hydraulic pressure from a master cylinder M is led and the parking brake application control hydraulic chamber 137 and a second normally closed valve 92' that is interposed in series between the disc brake side hydraulic path 76 and the parking brake release control hydraulic chamber 144 and a one-way valve 93'.

The second normally closed valve 92' is such as to be configured in the same manner as the normally closed valve 92 of the first embodiment and is configured so as to be opened in response to the operation of an operation lever 103 that is disposed in the vicinity of the driver's seat, that is, within a center console. In addition, with the basic configuration thereof being similar to that of the one-way valve 93 in the first embodiment, the one-way valve 93' is such as to be provided in a housing 94' of the secondary closed valve 92' and is disposed between the second normally closed valve 92' and a hydraulic path 148 which communicates with the parking brake release control hydraulic chamber 144.

In addition, the first normally closed valve 147 is such as to open when the hydraulic pressure in the hydraulic path 148 is increased as a result of the opening of the second normally closed valve 92'.

According to the manual change-over unit 146, when the hydraulic pressure control unit 87 fails in a parking brake applied state, the second normally closed valve 92' may be opened by operating the operation lever 103, and a brake pedal P may be depressed intermittently. Thus, a hydraulic pressure that is outputted from a master cylinder M by the operation of the brake pedal P is applied to the parking brake release control hydraulic chamber 144 via the one-way valve 93' and the first normally closed valve 147 opens in response to the increase in hydraulic pressure in the hydraulic path 148, whereby the parking brake application control hydraulic chamber 137 is allowed to communicate with the master cylinder M.

Consequently, when the depression effort on the brake pedal P is removed, while the hydraulic pressure in the parking brake application control hydraulic chamber 137 is returned to the master cylinder M side for release, the hydraulic pressure in the parking brake release control chamber 144 never returns to the master cylinder M side by the action of the one-way valve 93', and when the operation of the brake pedal P is stopped after the brake pedal P has been depressed intermittently a plurality of times, while the hydraulic pressure in the parking brake application control hydraulic chamber 137 is in a released state, the hydraulic pressure in the parking brake release control hydraulic chamber 144 is held to the hydraulic pressure on the lock release side, whereby the lock piston 140 operates to release the locked state, so that the parking brake applied state is released.

Thus, while the embodiments of the invention have been described heretofore, the invention is not limited thereto, and various design changes can be made thereto without departing from the scope of claims attached hereto.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake system comprising:
    a hydraulic pressure generating unit applying hydraulic pressure to a wheel brake side hydraulic path connected to a wheel brake in accordance with an operation of a brake operation member;
    a hydraulic pressure supply operated independently of the hydraulic pressure generating unit;
    a parking brake piston for achieving a parking brake applied state of a wheel mounted on the wheel brake through a forward movement thereof according to an increase of hydraulic pressure in a parking brake application control hydraulic chamber to which a back side of the parking brake piston faces;
    a lock piston operated to automatically lock the parking brake piston at a front position and also operated to a lock releasing side according to an increase of hydraulic pressure in a parking brake release control hydraulic chamber;
    a hydraulic pressure control unit which is electrically controllable to effect a changeover between:
        the application of hydraulic pressure from the hydraulic pressure supply to the parking brake application control hydraulic chamber and the parking brake release control hydraulic chamber and
        the release of hydraulic pressure applied from the parking brake application control hydraulic chamber and the parking brake release control hydraulic chamber; and
    a manual change-over unit provided among the wheel brake side hydraulic path, the parking brake application control hydraulic chamber and the parking brake release control hydraulic chamber, said manual change-over unit operable to selectively bypass the hydraulic pressure control unit, the manual change-over unit operated according to a manual operation of an operating member,
    wherein when the manual operation of an operating member is activated, the manual change-over unit establishes a communication between the wheel brake side hydraulic path and the parking brake application control hydraulic chamber and holds the hydraulic pressure of the parking brake release control hydraulic chamber to hydraulic pressure of the lock release side;
    a disc brake; and
    a drum brake for the parking brake,
    wherein the manual change-over unit includes:
    a first hydraulic path which connects between a disc brake side hydraulic path to which the output hydraulic pressure from the master cylinder is led and the parking brake application control hydraulic chamber to thereby bypass the hydraulic pressure control unit;
    a normally closed valve interposed in the first hydraulic path, the normally closed valve is opened by a manual operation;
    a second hydraulic path one end of which is connected to the first hydraulic path at a position between the normally closed valve and the parking brake application control hydraulic chamber, and the other end of which communicates with the parking brake release control hydraulic chamber in such a manner to bypass the hydraulic pressure control unit; and
    a one-way valve interposed in the second hydraulic path in such a manner as to permit only a flow to the parking brake release control hydraulic chamber side.

2. The vehicle brake system as set forth in claim 1, wherein the hydraulic pressure control unit controls such that:
    hydraulic pressure is applied to the parking brake application control hydraulic chamber and the parking brake release control hydraulic chamber so that the parking brake piston travels forwards while suppressing the locking operation of the lock piston;
    the hydraulic pressure in the parking brake release control hydraulic chamber is released to lock the parking brake piston; and
    after achieving the parking brake applied state, the hydraulic pressure in the parking brake application control hydraulic chamber is released.

3. The vehicle brake system as set forth in claim 1, wherein a pressure receiving area of the lock piston which faces the parking brake release control hydraulic chamber is set greater than a pressure receiving area of the parking brake piston which faces the parking brake application control hydraulic chamber.

4. The vehicle brake system as set forth in claim 1, wherein the drum brake includes a parking brake operation lever,
    wherein the parking piston and the lock piston are fixed to the drum brake in such a manner that a longitudinal axis of the parking piston is perpendicular to a longitudinal axis of the lock piston and that the parking piston is integral with the lock piston, and
    wherein the parking piston drives the parking brake operation lever to apply the parking brake.

5. A vehicle brake system capable of obtaining a parking brake applied state in which hydraulic pressures are changed over by electrically controlling a hydraulic pressure control unit and also release the parking brake applied state by a manual operation in the event the hydraulic pressure control unit fails in the parking brake applied state, the brake system comprising:
    a hydraulic pressure generating unit applying hydraulic pressure to a wheel brake side hydraulic path connected to a wheel brake in accordance with an operation of a brake operation member;
    a hydraulic pressure supply operated independently of the hydraulic pressure generating unit;
    a parking brake drive unit having a parking brake piston achieving a parking brake applied state of a wheel mounted on the wheel brake through a forward movement thereof according to an increase of hydraulic pressure in a parking brake application control hydraulic chamber to which a back side of the parking brake piston faces;
    a lock piston operated to automatically lock the parking brake piston at a locked position and also operated to a lock releasing side according to an increase of hydraulic pressure in a parking brake release control hydraulic chamber;
    a hydraulic pressure control unit which is electrically controlled to effect a changeover between:
        the application of hydraulic pressure from the hydraulic pressure supply to the parking brake application control hydraulic chamber and the parking brake release control hydraulic chamber; and the release of hydraulic pressure so applied from the parking brake application control hydraulic chamber and the parking brake release control hydraulic chamber; and a manual change-over unit provided separate from the hydraulic pressure control unit and provided parallel with the hydraulic pressure control unit in the wheel brake side hydraulic path, the parking brake application control hydraulic chamber and the parking brake release control hydraulic chamber in such a manner as to bypass the hydraulic pressure control unit, the manual change-over unit operated according to a manual operation of an operating member, wherein when the manual operation of an operating member is activated, the manual change-over unit establishes a communication between the wheel brake side hydraulic path and the parking brake application control hydraulic chamber and holds the hydraulic pressure of the parking brake release control hydraulic chamber to hydraulic pressure of the lock release side.

* * * * *